United States Patent
Venetianer et al.

(10) Patent No.: US 6,999,600 B2
(45) Date of Patent: Feb. 14, 2006

(54) VIDEO SCENE BACKGROUND MAINTENANCE USING CHANGE DETECTION AND CLASSIFICATION

(75) Inventors: Peter L. Venetianer, McLean, VA (US); Alan J. Lipton, Falls Church, VA (US); Andrew J. Chosak, Arlington, VA (US); Niels Haering, Reston, VA (US); Zhong Zhang, Herndon, VA (US)

(73) Assignee: Objectvideo, Inc., Reston, VA (US)

( * ) Notice: Subject to any disclaimer, the term of this patent is extended or adjusted under 35 U.S.C. 154(b) by 149 days.

(21) Appl. No.: 10/354,096

(22) Filed: Jan. 30, 2003

(65) Prior Publication Data

US 2004/0151342 A1   Aug. 5, 2004

(51) Int. Cl.
*G06K 9/00* (2006.01)

(52) U.S. Cl. .................. 382/103; 348/169
(58) Field of Classification Search ........... 382/103, 382/104, 107, 173, 232, 266; 348/143, 149, 348/152, 154, 171, 180, 169, 208.15, 113
See application file for complete search history.

(56) References Cited

U.S. PATENT DOCUMENTS

| | | | | |
|---|---|---|---|---|
| 5,812,787 A | * | 9/1998 | Astle | 709/247 |
| 6,078,619 A | * | 6/2000 | Monro et al. | 375/240 |
| 6,211,913 B1 | * | 4/2001 | Hansen et al. | 348/239 |
| 6,292,575 B1 | * | 9/2001 | Bortolussi et al. | 382/118 |
| 6,424,370 B1 | * | 7/2002 | Courtney | 348/143 |
| 6,542,621 B1 | * | 4/2003 | Brill et al. | 382/103 |
| 6,570,608 B1 | * | 5/2003 | Tserng | 348/143 |
| 6,583,403 B1 | * | 6/2003 | Koike et al. | 250/221 |
| 6,661,918 B1 | * | 12/2003 | Gordon et al. | 382/173 |
| 6,674,877 B1 | * | 1/2004 | Jojic et al. | 382/103 |
| 6,731,799 B1 | * | 5/2004 | Sun et al. | 382/173 |

OTHER PUBLICATIONS

Pankaj Kumar et al. (A Comparative Study of Different Color Spaces for Foreground and Shadow Detection for traffic Monitoring System IEEE—Sep. 2002).*

* cited by examiner

*Primary Examiner*—Kanji Bhai Patel
(74) *Attorney, Agent, or Firm*—Venable LLP; Michael A. Sartori; Jeffrey W. Gluck

(57) ABSTRACT

Video is processed by maintaining a background model for the video, detecting a target in the video, detecting if the target is a stationary target, and classifying the stationary target as an insertion in the background model or a removal from the background model.

22 Claims, 17 Drawing Sheets

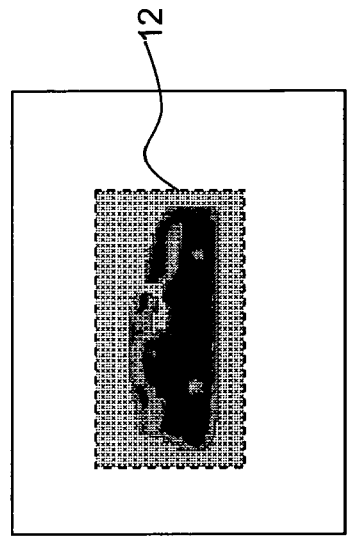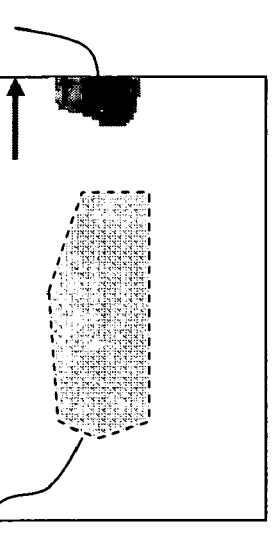
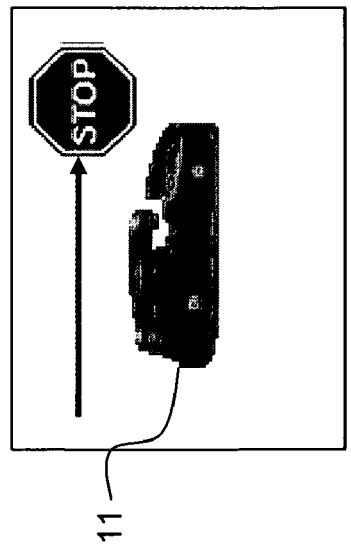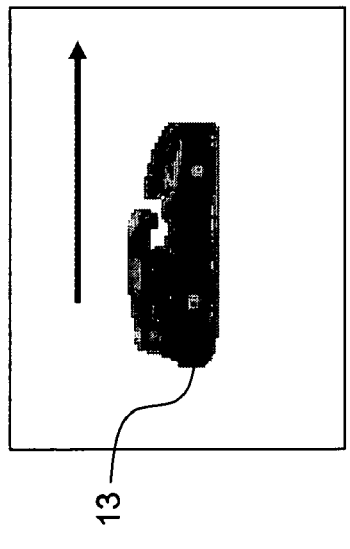
FIG. 1A
BACKGROUND ART
FIG. 1B
BACKGROUND ART

VIDEO SCENE BACKGROUND MAINTENANCE USING CHANGE DETECTION AND CLASSIFICATION

BACKGROUND OF THE INVENTION

1. Field of the Invention

The present invention is directed to the general field of video processing and to the more specific field of processing of segmented video. In particular, the invention is concerned with the maintenance of background models in segmented video and classifying changes to the background model.

2. Related Art

Many video processing applications require segmentation of video objects (i.e., the differentiation of legitimately moving objects from the static background scene depicted in a video sequence). Such applications include, for example, video mosaic building, object-based video compression, object-based video editing, and automated video surveillance. Many video object segmentation algorithms use video scene background models (which can simply be referred to as "background models") as an aid. The general idea is that each frame of a video sequence can be registered to the background model and compared, pixel-by-pixel, to the background model. Pixels that display sufficient difference are considered foreground, or moving, pixels. However, there are a Wide range of phenomena that can cause pixel-level changes, such as: unstable backgrounds (e.g., rippling water, blowing leaves, etc.); lighting phenomena (e.g., clouds moving across the sun, shadows, etc.); and camera phenomena (e.g., automatic gain control (AGC), auto iris, auto focus, etc.).

Using video object segmentation (or a variation thereof), objects, or parts of objects, that exhibit independent motion can usually be detected. There are two basic problems that arise when objects in a scene are stationary for a long period of time, and either of these two phenomena can degrade the performance of video object segmentation for any application.

First, if an object remains stationary for a long period of time, the object could be "permanently" detected as a foreground object. However, for all practical purposes, the object has become part of the background. In FIG. 1A, this problem is illustrated for a car 11 that drives into the video sequence and parks therein. The car is continually monitored as a foreground object 12 but has actually become part of the background (i.e., "permanent" segmentation).

Second, if an object, initially stationary, is part of the background model (e.g., gets "burned in") and then moves, the object exposes a region of the background model (e.g., static background) that has not been modeled. The exposed region of the background model is erroneously detected as a foreground object. In FIG. 1B, this problem is illustrated for a parked car 13 that drives out of the video sequence. The car 13 exposes a car-shaped "hole" 14 segmented in the background model.

As discussed, for example, in U.S. patent application Ser. No. 09/472,162, titled "Method, Apparatus, and System for Compressing/Decompressing Digital Video Data," filed Dec. 27, 1999, and U.S. patent application Ser. No. 09/609,919, titled "Scene Model Generation from Video for Use in Video Processing," filed Jul. 3, 2000 (both commonly assigned, and incorporated herein by reference), when building photo mosaics, video mosaics, or video scene models, it is often desirable to extract those portions of the source images that represent "true" background. For example, a parked car in a video sequence (or any other collection of images) that remains parked for the duration of the video sequence may be considered true background. However, a car in a video sequence that is initially parked and later drives away at some point in the video sequence should properly be considered "not background."

If care is not taken to identify true background regions, artifacts will result. If the goal is to produce a mosaic or background image, foreground objects can be "burned in" the background model resulting in unnatural-looking imagery. If the goal is to build a scene model as a basis for video segmentation, the results can be poor segmentations, where parts of foreground objects are not detected, and where some exposed background regions are detected as foreground objects.

FIG. 2 illustrates a prior art example of allowing foreground objects to corrupt a background model. The video sequence depicts a golfer preparing to tee off. A subset 21 of the source images from the video sequence depict a part of this video sequence. The source images are used to generate a background model 22 and foreground objects 23. However, the background model 22 contains foreground objects 23 (e.g., the golfer on the left, and part of the golfer's shirt on the right) burned into the background model 22, and the foreground objects 23 are incompletely segmented (e.g., part of the golfer's torso, and part of the golf club).

SUMMARY OF THE INVENTION

The invention employs change detection and classification for maintaining a background model of a video sequence. Further, the invention maintains a background model of a video sequence and classifies changes to the background model The invention includes a method for processing video, comprising the steps of: maintaining a background model for the video; detecting a target in the video; detecting if the target is a stationary target; and classifying the stationary target as an insertion in the background model or a removal from the background model.

The invention includes a computer system for processing video, comprising: a background model of the video; a background model-based pixel classification to produce a change mask and imagery based on the video and the background model; a background model update to update the background model based on the change mask and the imagery; a motion-based pixel classification to produce a motion mask based on the video; a blob generation to produce at least one blob based on the change mask and the motion mask; a blob tracking to produce at least one target based on the blobs; a stationary target detection and classification to produce a stationary target description based on each target, the stationary target description to identify each the target as an insertion in the background model or a removal from the background model; and a background model local update to update the background model based on each the stationary target description.

A system for the invention includes a computer system including a computer-readable medium having software to operate a computer in accordance with the invention.

An apparatus for the invention includes a computer including a computer-readable medium having software to operate the computer in accordance with the invention.

An article of manufacture for the invention includes a computer-readable medium having software to operate a computer in accordance with the invention.

Further features and advantages of the invention, as well as the structure and operation of various embodiments of the invention, are described in detail below with reference to the accompanying drawings.

Definitions

A "computer" refers to any apparatus that is capable of accepting a structured input, processing the structured input according to prescribed rules, and producing results of the processing as output. Examples of a computer include: a computer; a general purpose computer; a supercomputer; a mainframe; a super mini-computer; a mini-computer; a workstation; a microcomputer; a server; an interactive television; a web appliance; a telecommunications device with internet access; a hybrid combination of a computer and an interactive television; and application-specific hardware to emulate a computer and/or software. A computer can be stationary or portable. A computer can have a single processor or multiple processors, which can operate in parallel and/or not in parallel. A computer also refers to two or more computers connected together via a network for transmitting or receiving information between the computers. An example of such a computer includes a distributed computer system for processing information via computers linked by a network.

A "computer-readable medium" refers to any storage device used for storing data accessible by a computer. Examples of a computer-readable medium include: a magnetic hard disk; a floppy disk; an optical disk, such as a CD-ROM and a DVD; a magnetic tape; a memory chip; and a carrier wave used to carry computer-readable electronic data, such as those used in transmitting and receiving e-mail or in accessing a network.

"Software" refers to prescribed rules to operate a computer. Examples of software include: software; code segments; instructions; computer programs; and programmed logic.

A "computer system" refers to a system having a computer, where the computer comprises a computer-readable medium embodying software to operate the computer.

A "network" refers to a number of computers and associated devices that are connected by communication facilities. A network involves permanent connections such as cables or temporary connections such as those made through telephone, wireless, or other communication links. Examples of a network include: an internet, such as the Internet; an intranet; a local area network (LAN); a wide area network (WAN); and a combination of networks, such as an internet and an intranet.

"Video" refers to motion pictures represented in analog and/or digital form. Examples of video include television, movies, image sequences from a camera or other observer, and computer-generated image sequences. These can be obtained from, for example, a live feed, a storage device, an IEEE 1394-based interface, a video digitizer, a computer graphics engine, or a network connection.

"Video processing" refers to any manipulation of video, including, for example, compression and editing.

A "frame" refers to a particular image or other discrete unit within a video.

BRIEF DESCRIPTION OF THE DRAWINGS

The foregoing and other features and advantages of the invention will be apparent from the following, more particular description of a preferred embodiment of the invention, as illustrated in the accompanying drawings. The left most digits in the corresponding reference number indicate the drawing in which an element first appears.

FIGS. 1A and 1B illustrate prior art problems with using video object segmentation to detect objects, or parts of objects, that exhibit independent motion;

DETAILED DESCRIPTION OF THE EXEMPLARY EMBODIMENTS OF THE INVENTION

An exemplary embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention. The embodiments and examples discussed herein are non-limiting examples.

The invention employs change detection and classification for maintaining a background model of a video sequence. The invention can be used for real-time video processing applications (e.g., real-time object-based compression, or video surveillance), in which the video sequence may not be available in its entirety at any time, and incremental changes to the background model might be required to maintain its utility. The invention can also be used for non-real-time video processing applications. A video sequence refers to some or all of a video.

With the invention, first, local changes in the background model are detected and can be used to maintain the background model, and, second, such detected changes are classified and can be further processed. The detected changes are classified into two major categories: first, an object that is placed in the scene and remains static for a period of time (i.e., an insertion); and second, an object that moves out of the scene and exposes a section of the background model (e.g., the static background) (i.e., a removal). The common aspect of these two categories is that there is a permanent local change in the background model.

Classifying changes into these two categories can be very important in a wide range of applications, such as, for example, video surveillance applications. Examples of the first category (i.e., an insertion) for video surveillance applications include: monitoring no parking areas (and, for example, initiating an alarm if a car spends more than a certain amount of time in the no parking areas); detecting unattended bags at airports; and detecting unattended objects near sensitive areas, such as military installations and power plants. Examples of the second category (i.e., a removal) for video surveillance applications include: detecting the removal of a high value asset, such as an artifact from a museum, an expensive piece of hardware, or a car from a parking lot.

Figure 2:
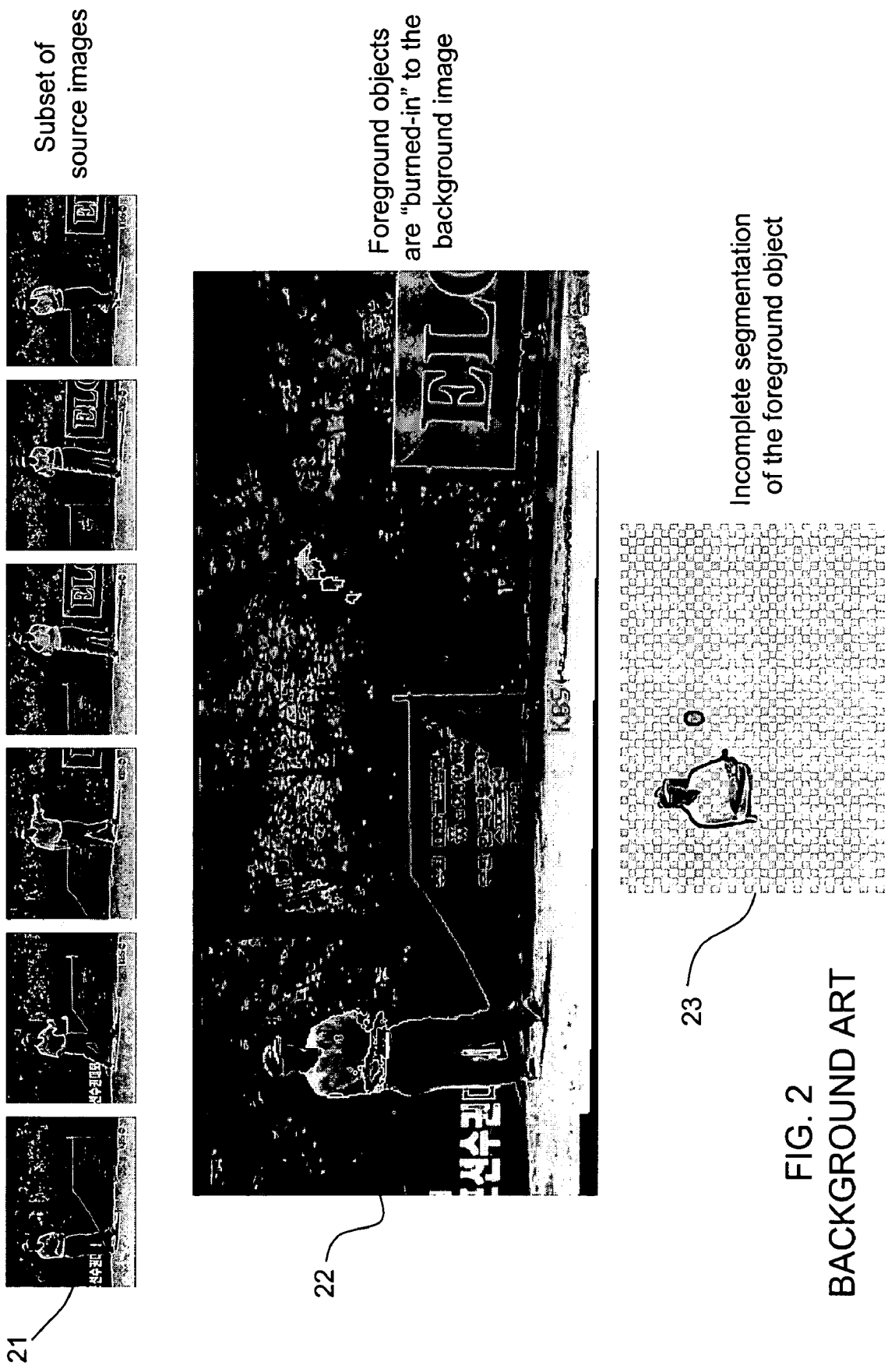
FIG. 2 illustrates a prior art example of allowing foreground objects to corrupt a background model.
Figure 3:
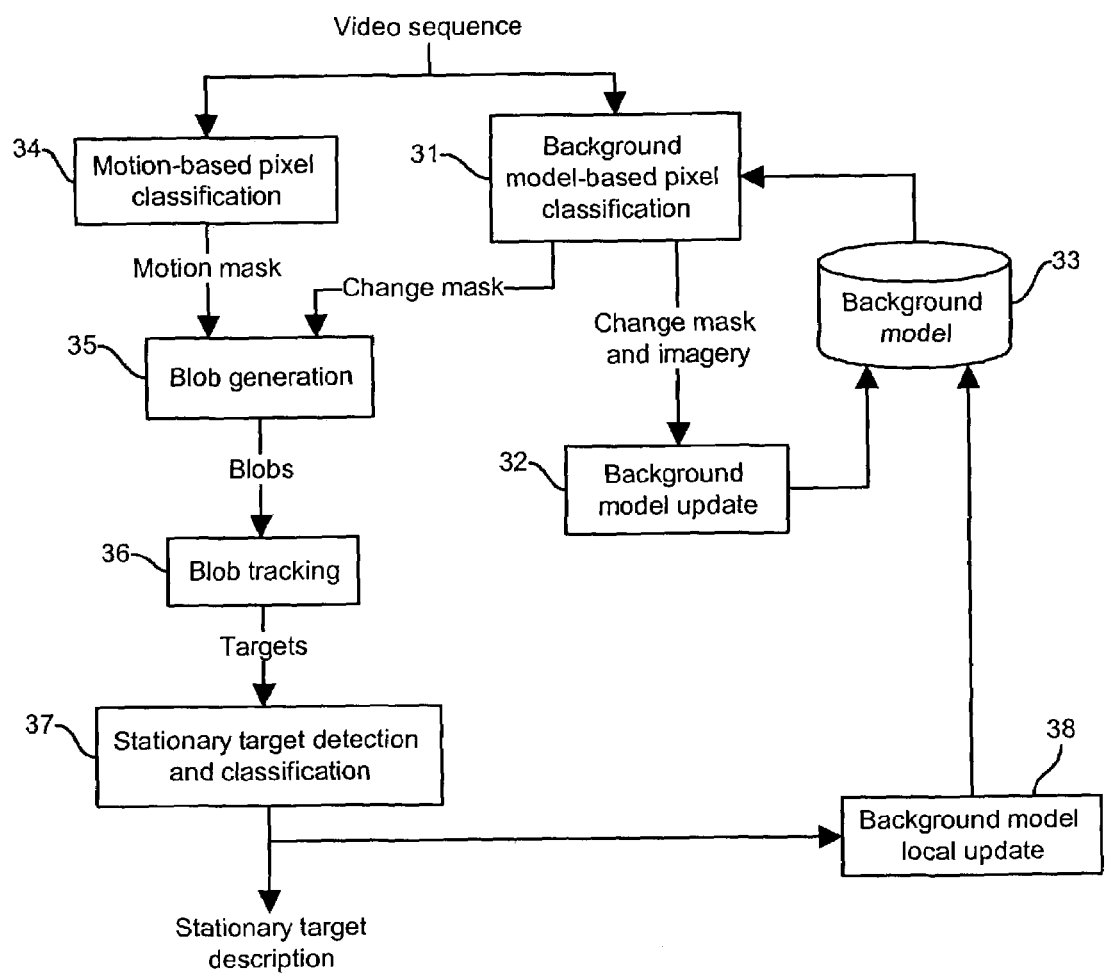
FIG. 3 illustrates a flowchart for a first embodiment of the invention.

FIG. 3 illustrates a flowchart for a first embodiment of the invention in one possible context of a general video processing system. A video sequence is input into the system, and a background model is generated and maintained 31, 32, and 33. The input video is processed by two separate low-level pixel classification techniques: background model-based pixel classification 31 and motion-based pixel classification 34. These two techniques produce pixel masks (per frame) that represent pixels of interest. The background model-based pixel classification 31 produces a change mask and imagery, and the motion-based pixel classification 34 produces a motion mask. The change mask and motion mask are provided to blob generation 35, which converts the masks into a set of one or more individual blobs representing the appearance of each visible foreground object at each frame. In general, if no foreground objects are visible, no blobs are generated. The blobs are tracked using blob tracking 36, which connects the blobs from one frame with those of other frames to generate a "target" representing each object in the scene. A target is a spatio-temporal description of a video object over time. The targets are analyzed by stationary target detection and classification 37, which determines whether any of the targets represent a "permanent" change to the background model 33 and whether that change represents an "insertion" (e.g., an object entering the scene) or a "removal" (e.g., an object leaving and exposing a section of background model). Finally, any stationary targets detected are inserted in the background model 33 by the background model local update 38.

Generating and maintaining a background model includes the background model-based pixel classification 31, the background model update 32, and the background model 33. One option for the background model-based approach 31, 32, and 33 employs dynamic statistical pixel modeling. Dynamic statistical pixel modeling maintains an accurate representation of the image background and differentiates background pixels from foreground pixels. In an exemplary embodiment, dynamic statistical pixel modeling is implemented with the techniques disclosed in commonly-assigned U.S. patent application Ser. No. 09/815,385, titled "Video Segmentation Using Statistical Pixel Modeling," filed Mar. 23, 2001, which is incorporated herein by reference. The general idea of the exemplary technique is that a history of all pixels is maintained over several frames, including pixel chromatic (or intensity) values and their statistics. A stable, unchanging pixel is treated as background. If the statistics of a pixel change significantly, the pixel can be considered to be foreground. If the pixel reverts to its original state, the pixel can revert to being considered a background pixel. This technique serves to alleviate sensor noise and to automatically address slow changes in the background due to lighting conditions and camera automatic gain control (AGC). Instead of dynamic statistical pixel modeling, the background model-based pixel classification 31 can be implemented using static background models, a mixture of gaussian background models or dynamically adaptive mixture of gaussian models.

The background model 33 is the internal representation of the static scene depicted in the video at any given time. Each time a new frame is analyzed, the background model 33 can be incrementally updated by the background model update 32. In addition to the incremental updates, the background model 33 needs to be updated when a background change is detected. For example, the chromatic information representing the new local static background region should be "burned-in" to the background model 33, which can be accomplished with the background model local update 38.

Figure 4:
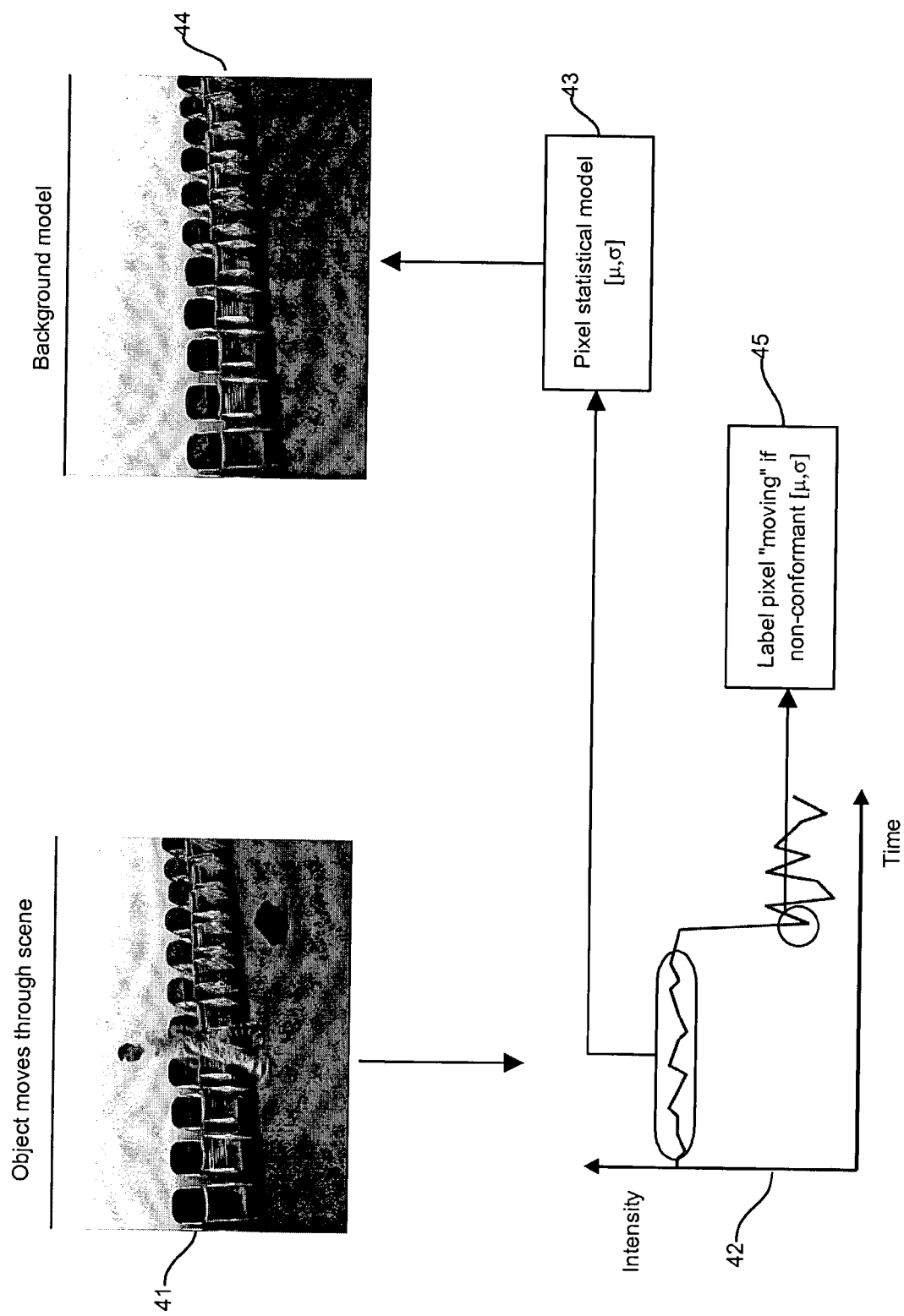
FIG. 4 illustrates pixel statistical background modeling to detect foreground pixels.
Figure 5:
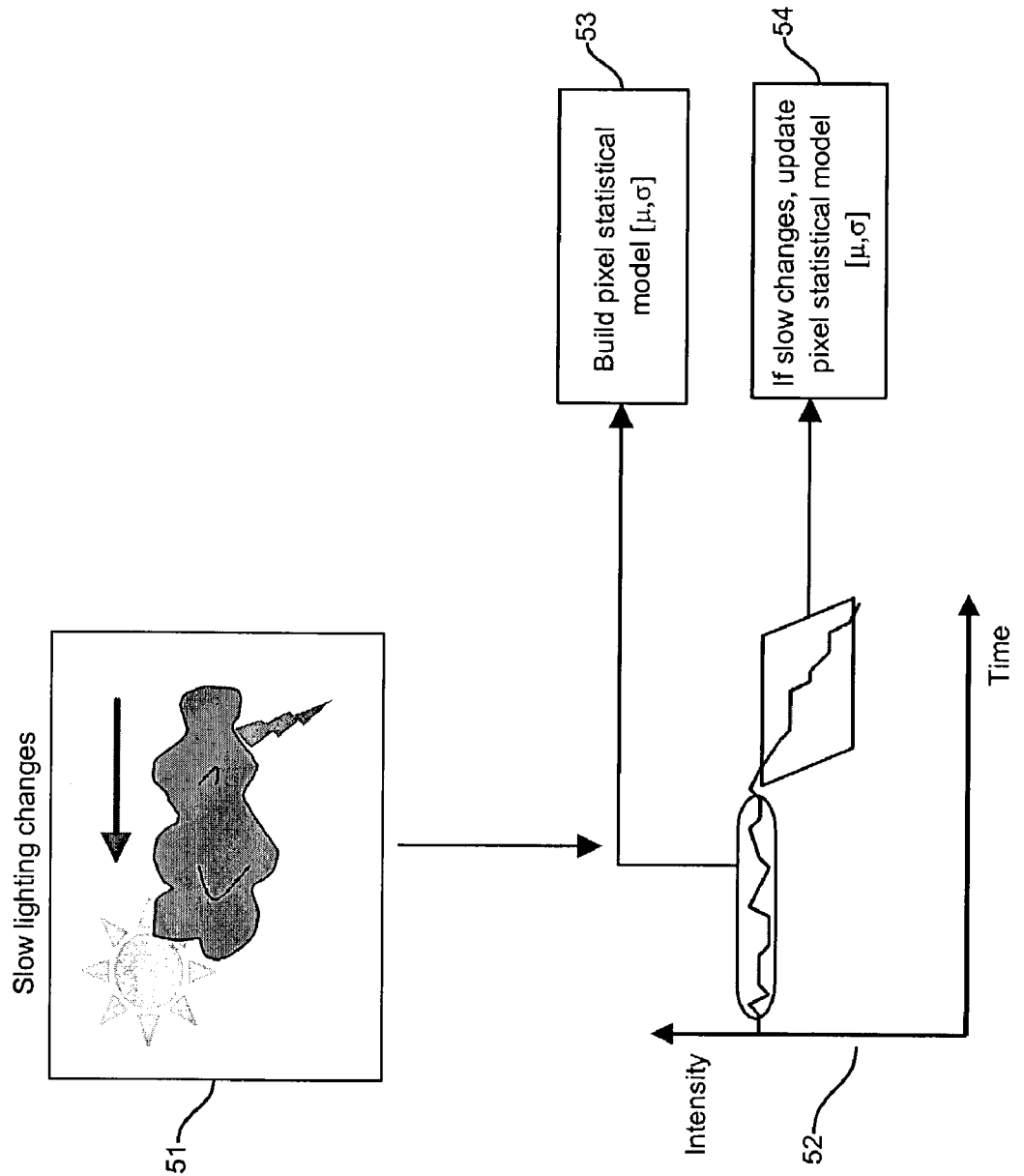
FIG. 5 illustrates pixel statistical background modeling to handle lighting changes.

FIGS. 4 and 5 illustrate using pixel modeling to generate and maintain a background model. In FIG. 4, pixel statistical background modeling is illustrated for detecting foreground pixels. Frame 41 is a current frame from a video of a man walking in front of stacked chairs and dropping a suitcase. In frame 41, the man has dropped the suitcase and is continuing forward. As illustrated with the graph 42 plotting intensity and time for a pixel in the video, the intensity mean and standard deviation for each pixel 43 are used to model the background 44. The background model 33 contains a mean and standard deviation for each pixel. The pixel classification algorithm 31 compares each pixel of the current frame 41 with the corresponding pixel of the background model 33. When an object moves "through" a pixel in the current frame 41, its value will not conform to the statistics captured in the background model 33 and is considered foreground 45. A change mask of foreground pixels is created by the background model-based classification 31 and forwarded to the blob generation 35. This change mask and the current frame 41 are both sent to the background model update 32 so that the pixel statistics comprising the background model 33 can be updated.

In FIG. 5, pixel statistical background modeling is illustrated for handling lighting changes. Frame 51 illustrates a slow lighting change in a video. As illustrated with the graph 52 plotting intensity and time for a pixel in the video, the intensity mean and standard deviation for each pixel 53 are used to model the background. Because the mean and standard deviation for each pixel is calculated from only the latest frames, the background model 33 is adapted to follow the slowly changing pixel intensity 54.

The motion-based pixel classification 34 determines whether a pixel is actually undergoing independent motion from frame to frame. One potential embodiment for the motion-based pixel classification 34 is three-frame differencing, as described in commonly-assigned U.S. patent application Ser. No. 09/694,712, filed Oct. 24, 2000, which is incorporated herein by reference. Other potential embodiments for the moving pixel classification 34 include two frame differencing and optical flow.

Figure 6:
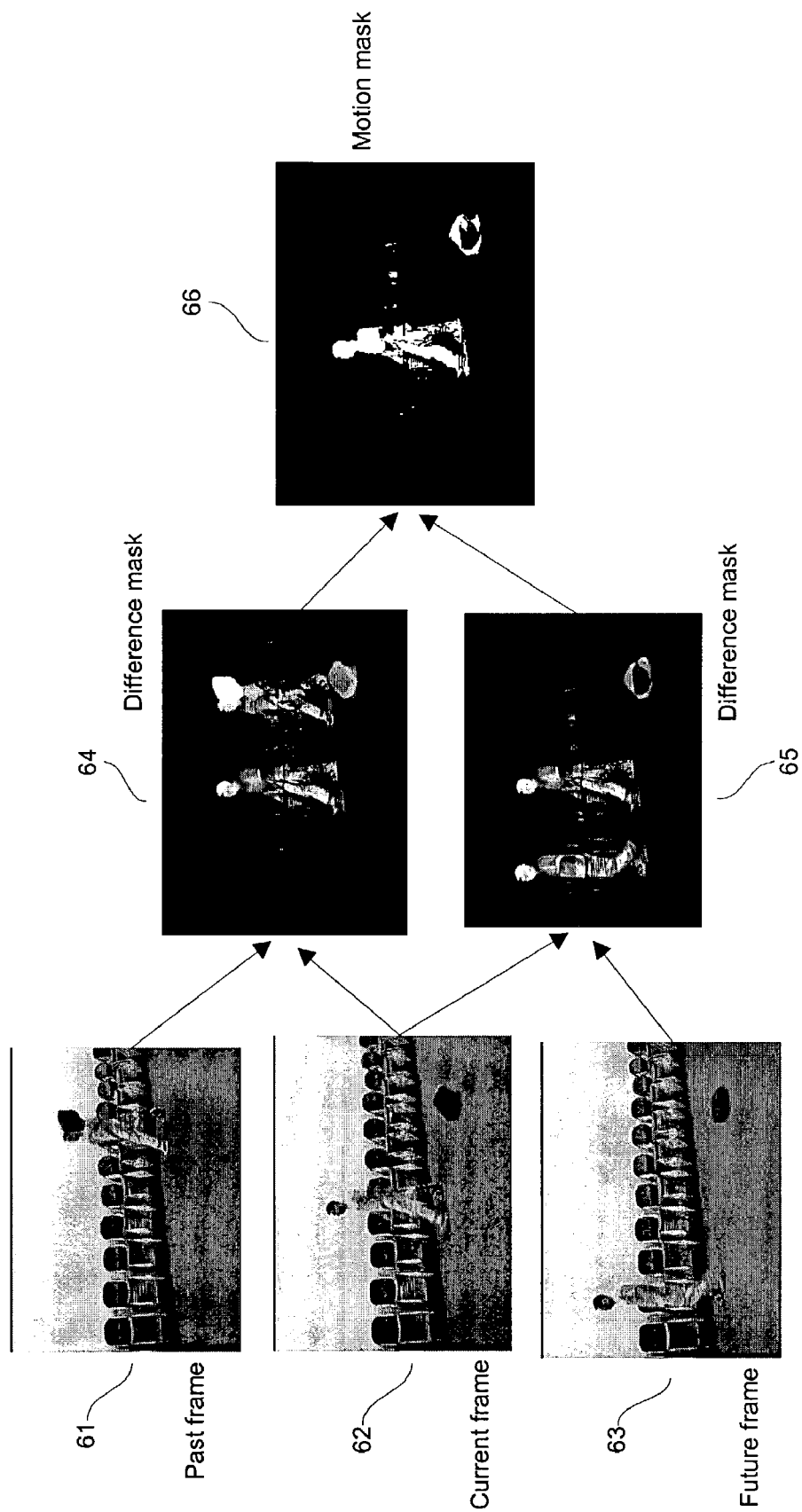
FIG. 6 illustrates using three-frame differencing for motion detection.

FIG. 6 illustrates using three-frame differencing for motion detection in the motion-based pixel classification 34. Frames 61, 62, and 63 are past, current, and future frames, respectively, from a video of a man walking in front of stacked chairs and dropping a suitcase. Difference mask 64 is obtained by comparing frames 61 and 62, and difference mask 65 is obtained by comparing frames 62 and 63. Motion mask 66 is obtained by comparing difference masks 64 and 65 using a logical AND. The motion mask 66 is forwarded to the blob generation 35.

The outputs from the background model-based pixel classification 31 and the motion-based pixel classification 34 may not concurrently detect a new foreground object. For example, a recently parked car might appear as a foreground object according to the background model-based pixel classification 31. However, because the parked car does not exhibit any actual independent motion, the motion-based pixel classification 34 might not detect any foreground object.

Figure 7:
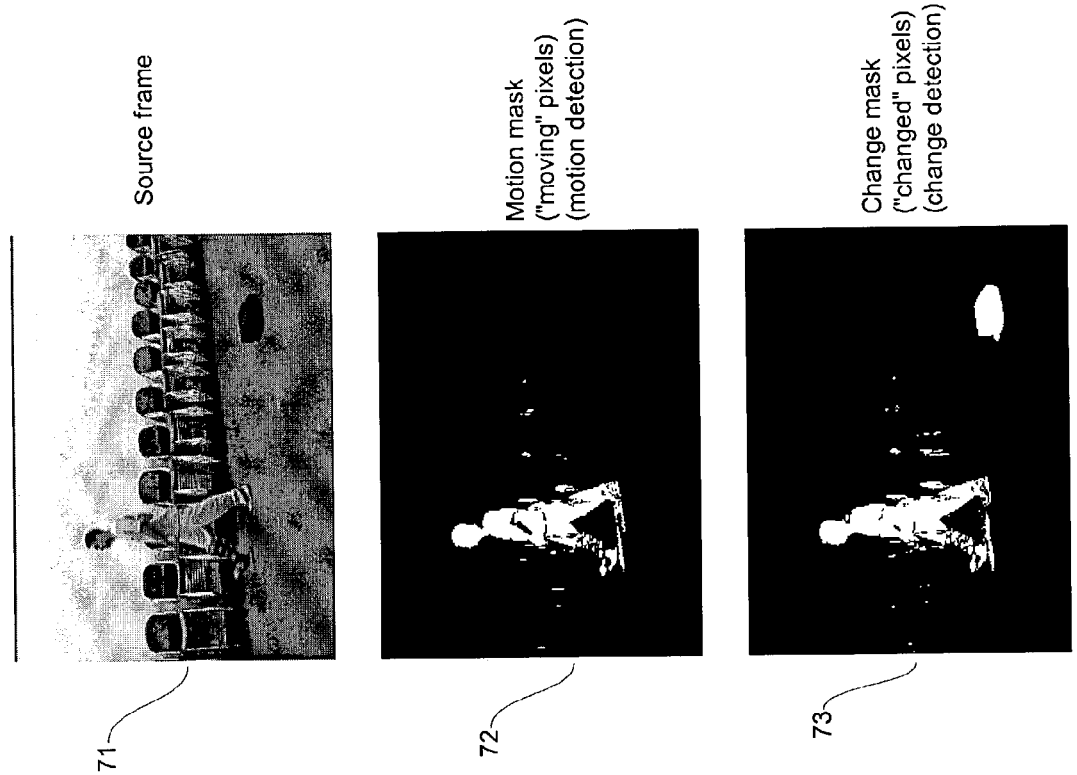
FIG. 7 illustrates detecting moving pixels and changed pixels.

Another example of this difference between changed pixels and moving pixels is illustrated in FIG. 7. Frame 71 is a frame from a video of a man walking in front of stacked chairs and dropping a suitcase. Motion mask 72 results from the motion-based pixel classification 34, which detects the man but not the suitcase. Change mask 73 results from the background model-based classification 31, which detects both the man and the suitcase. In this example, a recently inserted foreground object (i.e., the suitcase) is detected by the background model-based pixel classification 31 but not the motion-based pixel classification 34.

The blob generation 35 and the blob tracking 36 integrate the per frame pixel motion mask and change mask into targets (spatio-temporal descriptions of video objects). For the blob generation 35, there are many conventional techniques for agglomerating pixels into blobs, for example: connected components, as discussed in D. Ballard and C. Brown, "Computer Vision," Prentice-Hall, May 1982, which is incorporated herein by reference; and quasi-connected components, as discussed in T. E. Boult, R. J. Micheals, X. Gao, P. Lewis, C. Power, W. Yin, and A. Erkan, "Frame-Rate Omnidirectional Surveillance and Tracking of Camouflaged and Occluded Targets," Proc. of the IEEE Workshop on Visual Surveillance, June 1999, which is incorporated herein by reference. For the blob tracking 36, there are many conventional techniques for tracking blobs over time to form targets. Exemplary tracking techniques are discussed in the following, which are all incorporated herein by reference: commonly-assigned U.S. patent application Ser. No. 09/694,712, titled "Interactive Video Manipulation," filed Oct. 24, 2000; Wren, C. R. et al., "Pfinder: Real-Time Tracking of the Human Body," *IEEE Trans. on Pattern Matching and Machine Intelligence*, Vol. 19, pp. 780–784, 1997; Grimson, W. E. L. et al., "Using Adaptive Tracking to Classify and Monitor Activities in a Site," *CVPR*, pp. 22–29, Jun. 1998; and Olson, T. J. and Brill, F. Z., "Moving Object Detection and Event Recognition Algorithm for Smart Cameras, *IUW*, pp. 159–175, May 1997.

The stationary target detection and classification 37 analyzes targets generated by the blob tracking 36 to determine if each target is stationary. A target can be determined to be stationary if the target represents a local change in the background model 33. A target can represent a change in the background model 33 if, for example, a video object has ceased moving (i.e., an insertion) or a previously stationary video object has exposed a section of static background that appears as a target (i.e., a removal).

Once a stationary target has been detected, this information can be fed back to the background model local update 38 to update the background model 33. With this feedback, the background model 33 can be kept up to date concerning what constitutes static background and legitimate foreground activity.

The stationary target detection and classification 37 determines if a target is stationary, and if so, whether it should be labeled as an insertion, a removal, or unknown, if it is not possible to determine the difference. In distinguishing between an insertion and a removal, the relationship between the time scales for an insertion and a removal is important. An insertion may involve a different time scale than that of a removal, and these time scales may be application dependent. For example, an application may require that an object be left in place for a large amount of time before being considered an insertion but only a short amount of time before being considered a removal. As a specific example, a car parked at a curb at an airport for five minutes may not be a concern and may not be considered an insertion, but a car parked at the curb for fifteen minutes may be a concern and considered an insertion. Further, the same car, as soon as it moves away from the curb may be considered a removal. In this example, the time scale for an insertion is longer than the time scale for a removal. For another application, the relative time scales for an insertion and a removal may be reversed from the example above such that the time scale for a removal is longer than the time scale for an insertion. Further, the time scales for an insertion and a removal can be configurable by a user.

Figure 8:
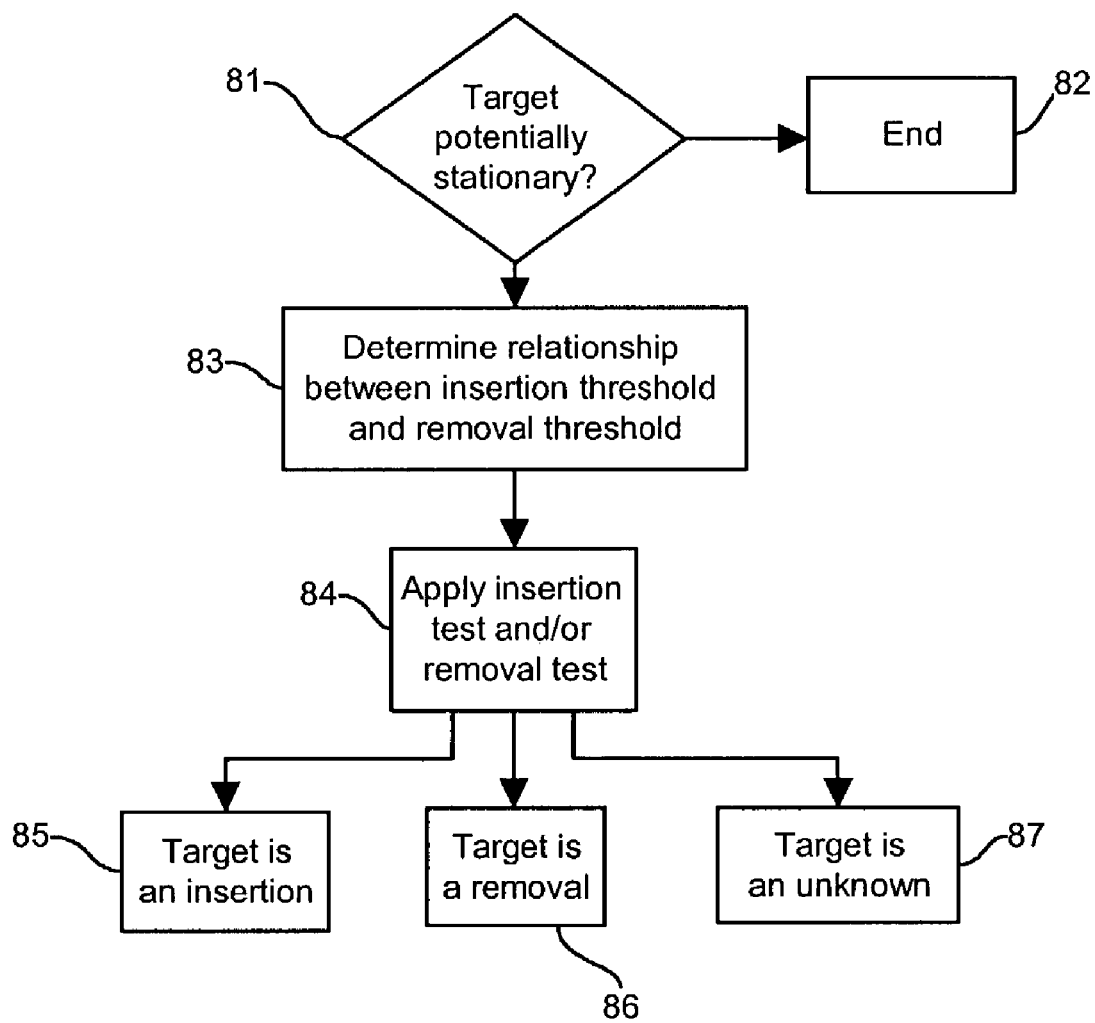
FIG. 8 illustrates a flowchart for stationary target detection and classification.

FIG. 8 illustrates a flowchart for the stationary target detection and classification 37. An exemplary pseudo-code for implementing the stationary target detection and classification 37 is as follows:

```
if (target is POTENTIALLY_STATIONARY)
    if (insertion_time_threshold < removal_time_threshold)
        1st_time_threshold ← insertion_time_threshold
        1st_test ← insertion_test
        1st_label ← INSERTION
        2nd_time_threshold ← removal_time_threshold
        2nd_test ← removal_test
        2nd_label ← REMOVAL
    else
        2nd_time_threshold ← insertion_time_threshold
        2nd_test ← insertion_test
        2nd_label ← INSERTION
        1st_time_threshold ← removal_time_threshold
        1st_test ← removal_test
        1st_label ← REMOVAL
    end
    if (target_age > 1st_time_threshold)
        if (1st_test is true for target)
            target_label ← 1st_label
        elseif (target_age > 2nd_time_threshold)
            if (2nd_test is true for target)
                target_label ← 2nd_label
            else
                target_label ← UNKNOWN
            end
        end
    end
end
```

In block 81, each target provided by the blob generation 35 is examined to determine if the target is potentially stationary. This block corresponds to the first "if" condition in the above pseudo-code (i.e., if (target is POTENTIALLY_STATIONARY)). If the target is not potentially stationary, flow proceeds to block 82 and ends.

An exemplary technique to determine if a target is potentially stationary uses various spatio-temporal properties and features of the target. If a target has not radically changed its shape and size for a period of time, the target may a stationary target. Furthermore, if a target exhibits a large amount of change from the background (as determined by change detection 31, 32, 33), but very little independent motion (as determined by motion detection 34), the target is almost certainly a stationary target.

Figure 9:
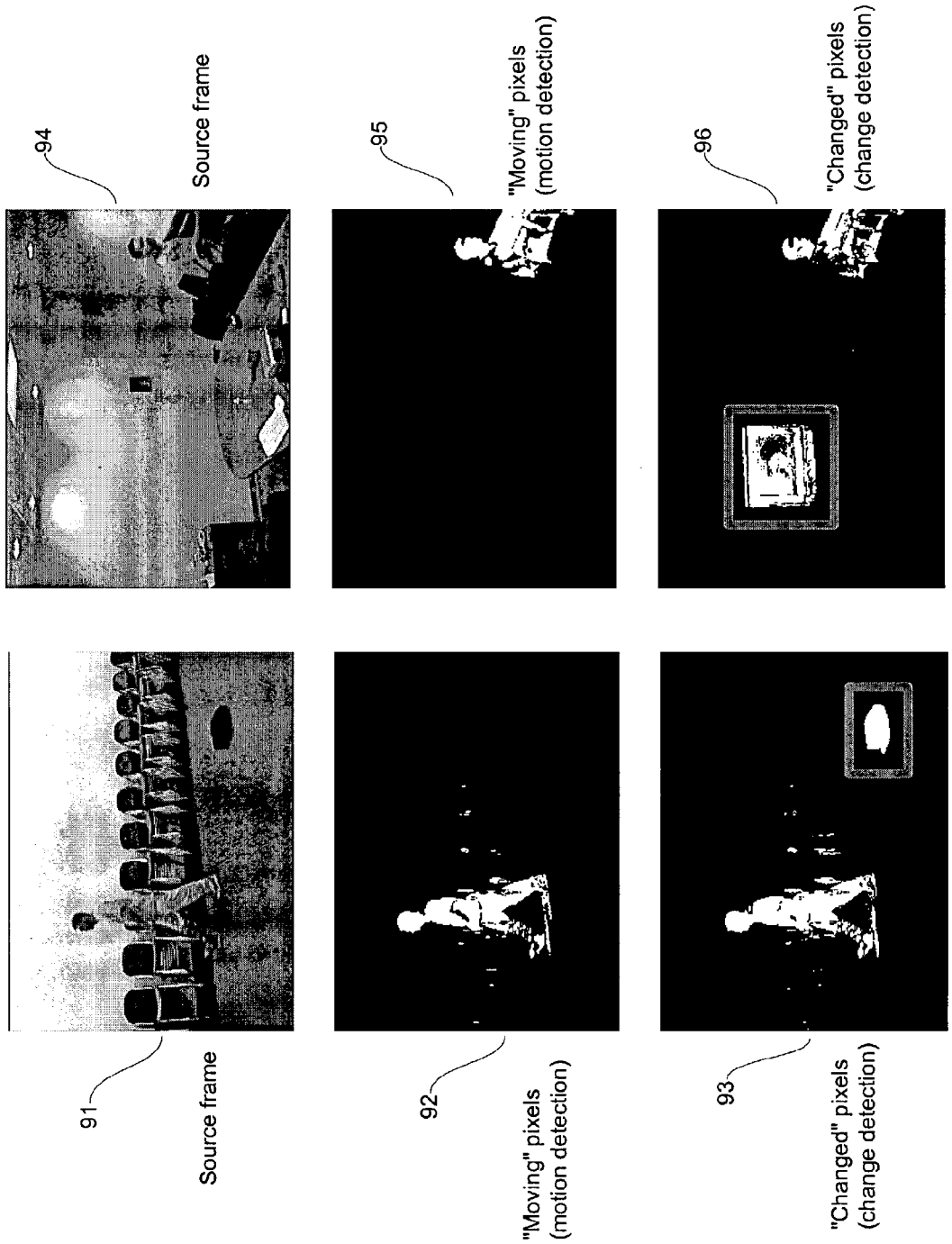
FIG. 9 illustrates background change detection.

Two examples of a potentially stationary target are illustrated in FIG. 9. Image 91 is a current frame from a video of a man walking in front of stacked chairs and dropping a briefcase, and image 94 is a current frame from a video of a man removing artwork from a room. Motion masks 92 and 95 result from the motion-based pixel classification 34 and illustrate pixel masks of "moving" pixels (i.e., pixels that exhibit motion). Motion mask 92 detects the man but not the suitcase in frame 91, and motion mask 95 detects the man walking with the artwork, but not the absence on the wall. Change masks 93 and 96 result from the background model-based pixel classification 31 and illustrate pixel masks of "changed" pixels (i.e., pixels that differ from the background model 33). Change mask 93 detects both the man and the briefcase, and change mask 96 detects both the man walking with the artwork and the absence on the wall. As indicated with the overlay squares on change masks 93 and 96, there are areas which have clearly changed with respect to the background model 33, but do not exhibit any independent motion. In the change mask 93, the insertion of the briefcase does not exhibit any independent motion, and in the change mask 96, the removal of the artwork from the wall does not exhibit any independent motion. These areas are determined by the stationary target detection and classification 37 as potentially stationary targets.

In one embodiment of the invention to determine a stationary target, exemplary quantifiable target properties are determined. For example, $\mu_{\Delta C}$ and $\sigma\Delta_C$ can represent statistical properties of a centroid trajectory of the target. Specifically, $\mu_{\Delta C}$ can represent the mean (over time) of the difference in centroid position (in pixels) between consecutive frames, and $\sigma_{\Delta C}$ can represent the standard deviation (over time) of the difference in centroid position (in pixels) between consecutive frames. In general, $\mu_{\Delta C}$ and $\sigma_{\Delta C}$ represent statistical properties of a centroid trajectory of the stationary target.

Further, $\mu_R$ and $\sigma_R$ represent statistical properties of the pixel area of the target. Specifically, $\mu_R$ can represent the mean (over some recent period of time) of the ratio of the area of the target (in pixels) between consecutive frames, and $\sigma_R$ can represent the standard deviation (over some recent period of time) of the ratio of the area of the target (in pixels) between consecutive frames. These four exemplary target properties (i.e., $\mu_{\Delta C}$, $\sigma_{\Delta C}$, $\mu_R$, and $\sigma_R$) capture the general motion and size change of a target over time.

In addition, $\mu_M$ and $\sigma_M$ represent statistical properties of moving pixels of the stationary target. Specifically, $\mu_M$ can represent the mean (over some recent period of time) of the ratio of the number of "moving" pixels to the area of the target (in pixels), and $\sigma_M$ can represent the standard deviation (over some recent period of time) of the ratio of the number of "moving" pixels to the area of the target (in pixels). These two exemplary target properties (i.e., $\mu_M$ and $\sigma_M$) capture the extent to which a target is exhibiting independent motion, as per the discussion above.

Using these six exemplary target properties, one possible technique for determining whether a target is potentially stationary is based on the following pseudo-code:

```
If (μ_ΔC < THRESHOLD1 && σ_ΔC < THRESHOLD2 &&
μ_R < THRESHOLD3 &&
    σ_R < THRESHOLD4 && μ_M < THRESHOLD5 &&
    σ_M < THRESHOLD6)
        target ← potentially_stationary
end
```

In the pseudo-code, six thresholds (i.e., THRESHOLD1, THRESHOLD2, THRESHOLD3, THRESHOLD4, THRESHOLD5, and THRESHOLD6) are used to perform threshold comparisons with the exemplary target properties. The six thresholds can be preset and/or arbitrarily set as user parameters.

Although four exemplary target properties (i.e., $\mu_{\Delta C}$, $\sigma_{\Delta C}$, $\mu_R$, and $\sigma_R$) are discussed as representing the general motion and size change of a target over time, other properties can be used as will become apparent to those of ordinary skill in the art.

Although two exemplary target properties (i.e., $\mu_M$ and $\sigma_M$) are discussed as representing exhibiting independent motion, other properties can be used as will become apparent to those of ordinary skill in the art.

Although above six statistical properties (i.e., $\mu_{\Delta C}$, $\sigma_{\Delta C}$, $\mu_R$, $\sigma_R$, $\mu_M$, and $\sigma_M$) are discussed, other combinations of these statistical properties, other statistical properties, and/or other properties can be used as will become apparent to those of ordinary skill in the art.

In block 83, relationships between an insertion threshold and a removal threshold are determined. This block corresponds to the second "if" condition block in the above pseudo-code (i.e., if (insertion_time_threshold<removal_time_threshold)). The pseudo-code for classifying the detected targets depends on the relationship between the insertion time threshold and the removal time threshold. This relationship determines which of the two tests, namely an insertion test or a removal test, is performed first. The insertion time threshold and the removal time threshold are points in time based on the time scales set for an insertion and a removal, as discussed above. In the pseudo-code, the insertion time threshold and the removal time threshold are compared to the target age.

In block 84, the insertion test and/or the removal test is applied. If the application of these tests determines the target is an insertion, flow proceeds to block 85, and the target is classified as an insertion. If the application of these tests determines the target is a removal, flow proceeds to block 86, and the target is classified as a removal. If the application of these tests is inconclusive as to whether the target is an insertion or a removal, flow proceeds to block 87, and the target is classified as an unknown. Blocks 84–86 correspond to the third "if" condition block in the above pseudo-code (i.e., if (target_age>$1^{st}$_time_threshold)). Once a potentially stationary target is considered to be stationary by passing the insertion test and/or the removal test, its description is sent to the background model local update 38, which modifies the background model 33 at the location of the potentially stationary target. This process involves replacing the background model statistics (mean and variance) of the pixels representing the potentially stationary target. The values of the mean and variance of the pixels representing the stationary target will be modified to represent the mean and variance of the pixels from more recent frames representing the potentially stationary target.

Figure 10:
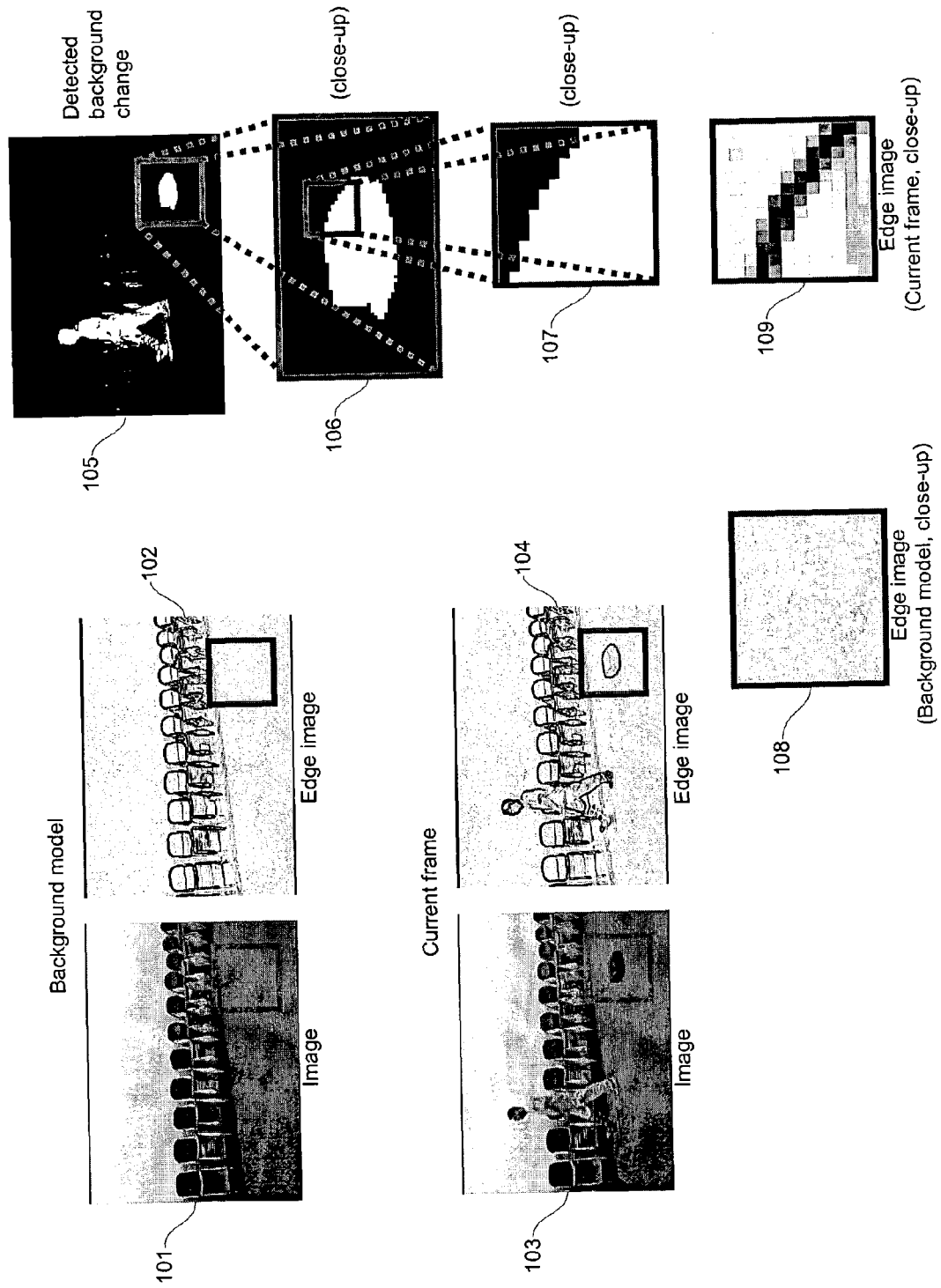
FIG. 10 illustrates insertion of a foreground object.
Figure 11:
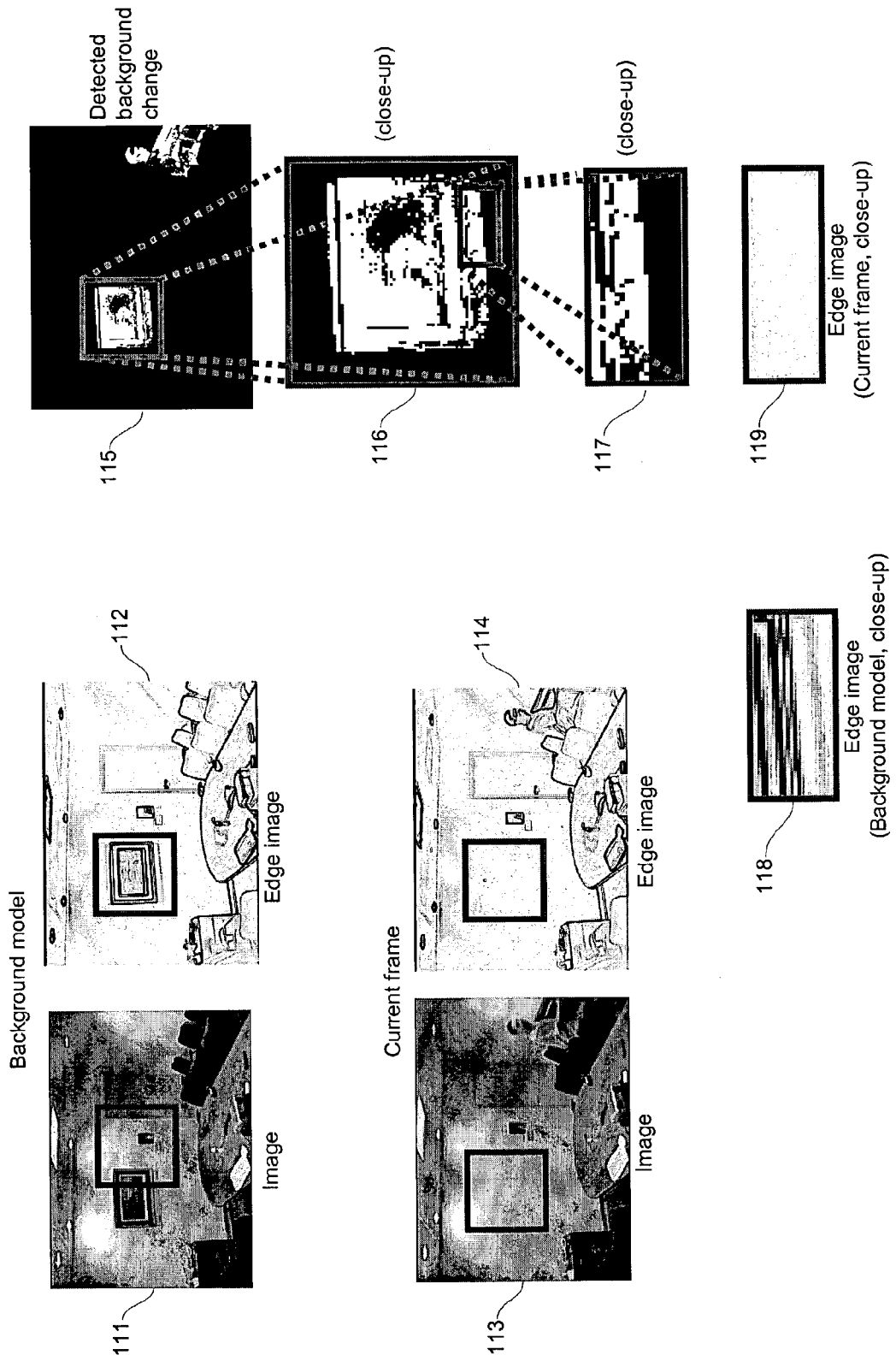
FIG. 11 illustrates removal of a portion of the background.

The insertion test and the removal test are illustrated with FIGS. 10 and 11. The theory behind the exemplary classification technique of the invention is that an insertion can be characterized as a region that exhibits strong edges around its periphery in a current image but does not exhibit strong edges around the periphery of the same region in the background model. Conversely, a removal can be characterized as a region that exhibits strong edges around its periphery in the background model but does not exhibit strong edges around its periphery in a current image.

FIG. 10 illustrates classifying an insertion. The video in this example is of a man walking in front of stacked chairs and dropping a briefcase. Image 101 illustrates an image of the background model, and background edge image 102 illustrates the corresponding edges of image 101 determined using a Sobel edge detector. Image 103 illustrates an image of the current frame, and current frame edge image 104 illustrates the corresponding edges of image 103 determined using a Sobel edge detector. As can be seen, the briefcase exhibits very strong edges in the current frame (i.e., current frame edge image 104), but not in the background model (i.e., background edge image 102). Change mask 105 shows the detected changed pixels, including the stationary object (i.e., the briefcase). Image 106 is a close-up of the briefcase region in change mask 105, and image 107 is a close-up of a section on the periphery of the briefcase region in image 106. Images 108 and 109 show the edges corresponding to the section of image 107 for both the background edge image 102 and the current frame edge image 104, respectively. As can be seen, the edge strength in the image 109 for the current frame is greater than the edge strength in image 108 for the background model. Hence, the target (i.e., the briefcase) is classified as an insertion.

FIG. 11 illustrates classifying a removal. The video in this example is of a man removing artwork from a room. Image 111 illustrates an image of the background model, and background edge image 112 illustrates the corresponding edges of image 111 determined using a Sobel edge detector. Image 113 illustrates an image of the current frame, and current frame edge image 114 illustrates the corresponding edges of image 113 determined using a Sobel edge detector. As can be seen, the artwork exhibits very strong edges in the background model (i.e., background model edge image 112), but not in the current frame (i.e., current frame image 114). Change mask 115 shows the detected changed pixels, including the stationary object (i.e., the artwork). Image 116 is a close-up of the artwork region in change mask 115, and image 117 is a close-up of a section on the periphery of the artwork region in image 116. Images 118 and 119 show the edges corresponding to the section of image 117 for both the background edge image 112 and the current frame edge image 114, respectively. As can be seen, the edge strength in the image 118 for the background model is greater than the edge strength in image 119 for the current frame. Hence, the target (i.e., the artwork) is classified as a removal.

Figure 12:
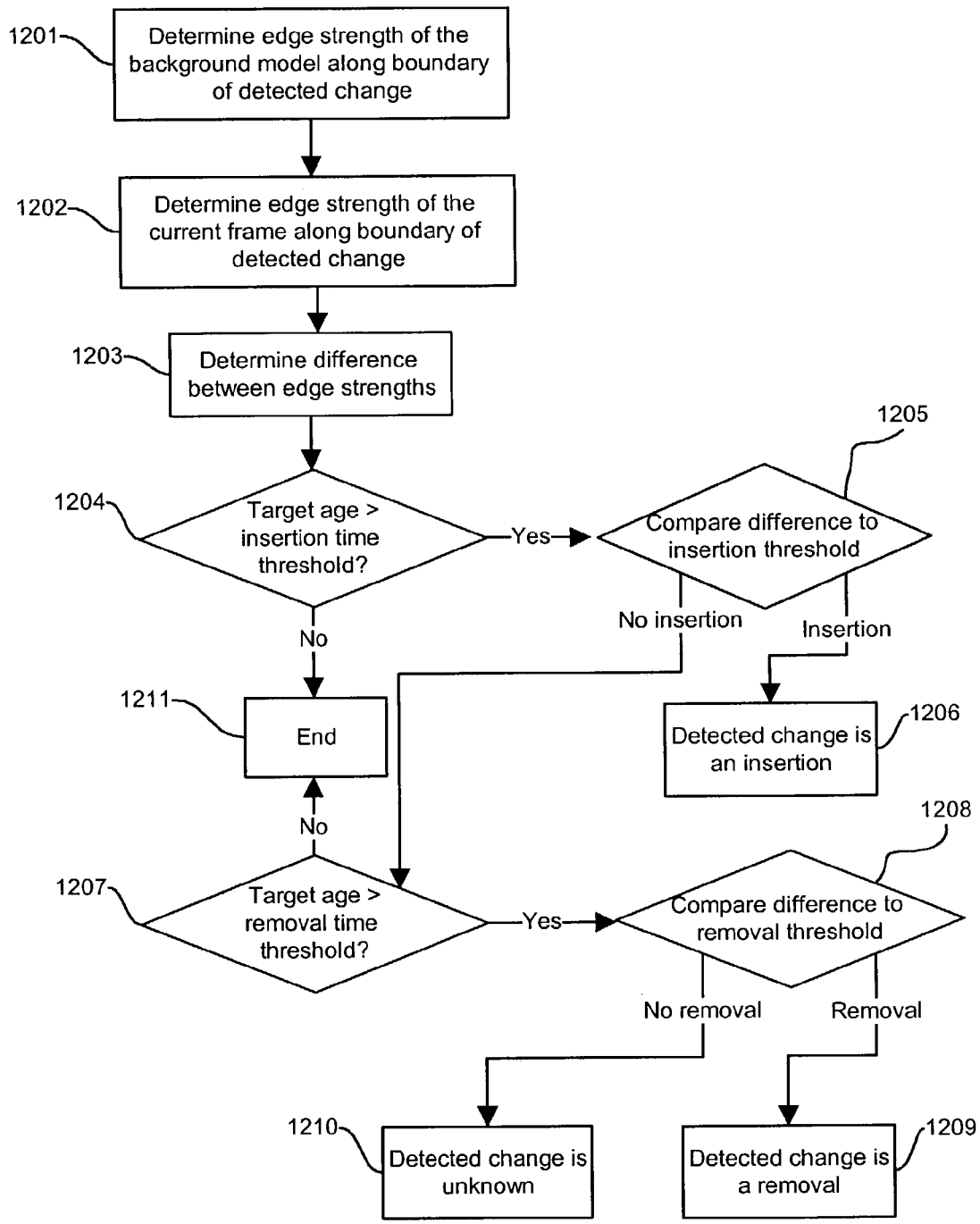
FIG. 12 illustrates a flowchart for detecting strong edges.
Figure 13:
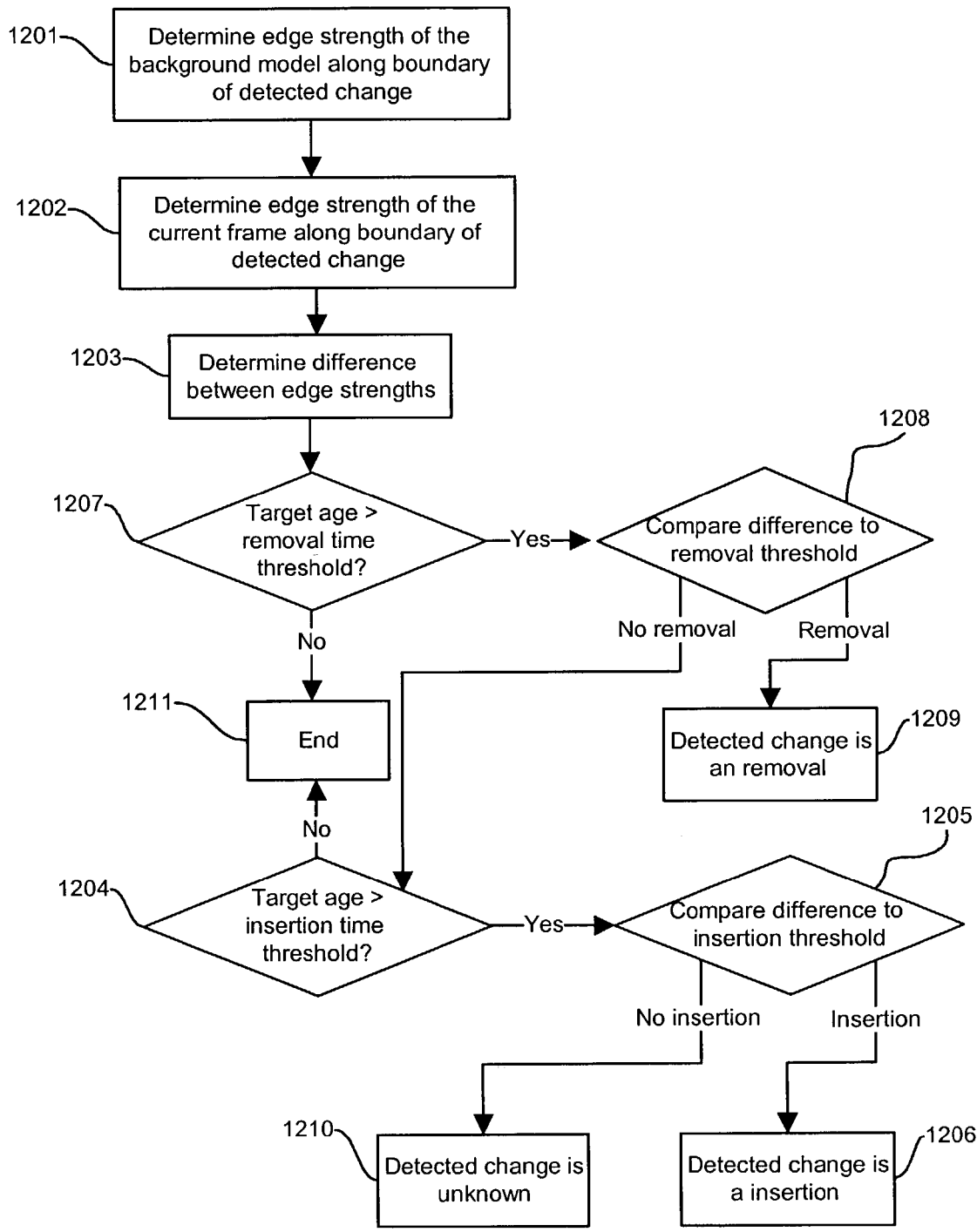
FIG. 13 illustrates another flowchart for detecting strong edges.

FIGS. 12 and 13 illustrate two embodiments for blocks 84–87 in FIG. 8. FIG. 12 illustrates the embodiment for the case where the insertion time threshold is less than the removal time threshold, and FIG. 13 illustrates the corresponding other case where the insertion time threshold is not less than the removal time threshold.

In FIG. 12, for block 1201, the edge strength $E_B$ of the background is determined along the boundary of the potentially stationary target (i.e., the detected change).

In block 1202, the edge strength $E_F$ of the current frame is determined along the boundary of the stationary target.

In block 1203, the difference between the edge strength $E_B$ of the background and the edge strength $E_F$ of the current frame is determined (i.e., $\Delta E = E_B - E_F$).

In block 1204, the target age is compared to the insertion time threshold. If the target age is greater than the insertion time threshold, flow proceeds to block 1205. Otherwise, flow proceeds to block 1211 and ends.

In block 1205, the difference $\Delta E$ is compared to an insertion threshold $TH_1$. For the formulation here, if $\Delta E < TH_1$ (where $TH_1 < 0$), the stationary target is an insertion, and flow proceeds to block 1206. Otherwise, flow proceeds to block 1207.

In block 1206, the stationary target is classified as an insertion.

In block 1207, the target age is compared to the removal time threshold. If the target age is greater than the removal time threshold, flow proceeds to block 1208. Otherwise, flow proceeds to block 1211 and ends.

In block 1208, the difference $\Delta E$ is compared to a removal threshold $TH_R$. For the formulation here, if $\Delta E > TH_R$, the stationary target is a removal, and flow proceeds to block 1209. Otherwise, flow proceeds to block 1210.

In block 1209, the stationary target is classified as a removal.

In block 1210, the stationary target cannot be classified as either an insertion or a removal and is, instead, classified as an unknown.

After blocks 1206, 1208, and 1210, the description of the stationary target is sent to the background model local update 38, which modifies the background model 33 to reflect the change caused by the detected stationary target. Even though the stationary target can not be classified as insertion or removal (block 1210), the background model is still updated.

To increase robustness, the edge strengths $E_B$ and $E_F$ can be determined in blocks 1201 and 1202 over a series of frames and averaged over time.

FIG. 13 is the same as FIG. 12, except for the change of places in the flowchart for blocks 1204–1206 and blocks 1207–1209.

Figure 14:
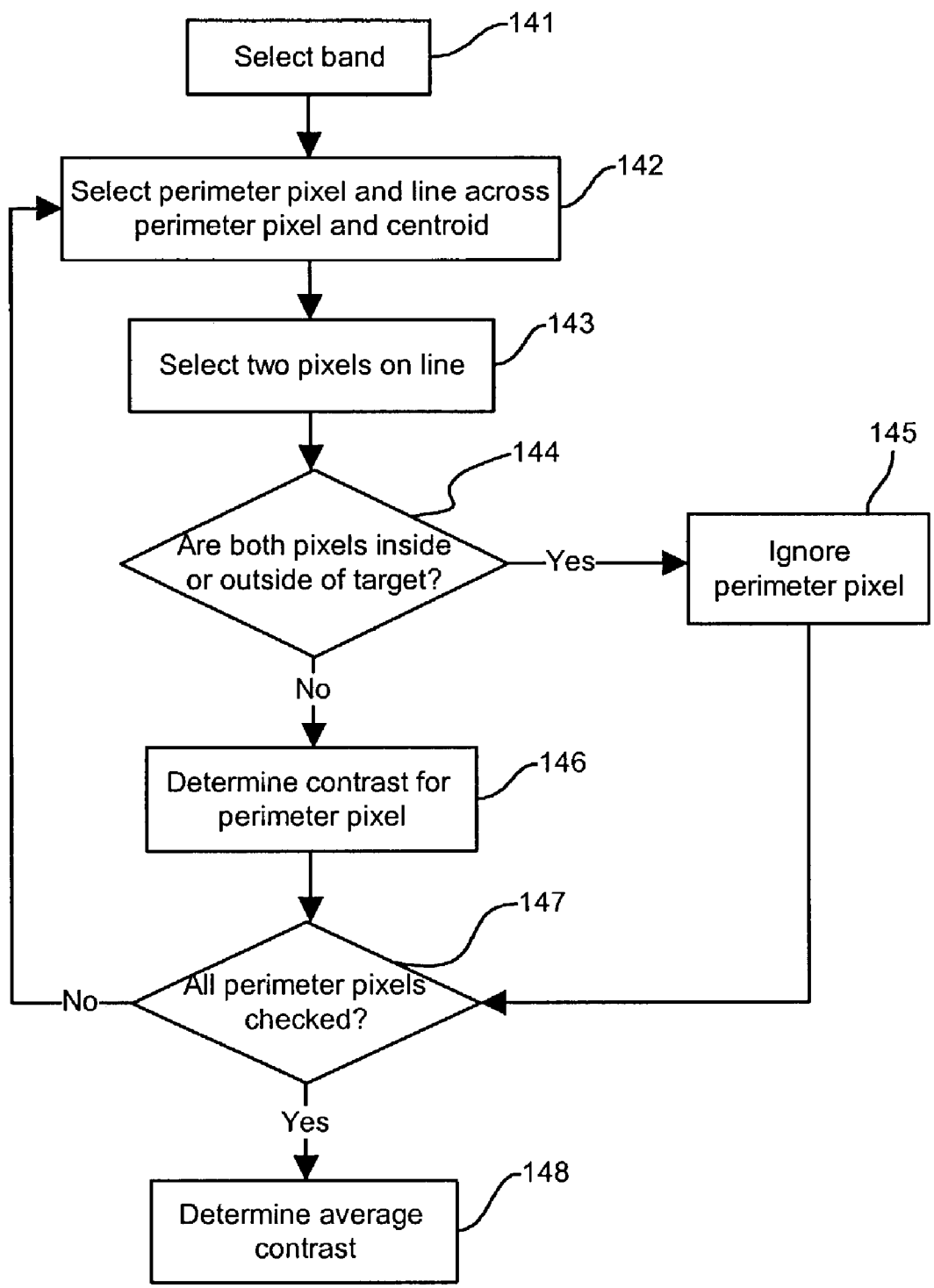
FIG. 14 illustrates a flowchart for determining edge strength.

FIG. 14 illustrates a flowchart for an exemplary technique for determining the edge strengths $E_B$ and $E_F$ for blocks 1201 and 1202. Other techniques are available, as will become evident to those of ordinary skill in the art. FIG. 14 is discussed in relation to FIG. 15, which illustrates an exemplary stationary target over which the edge strengths are determined. With the exemplary technique of FIG. 14, some uncertainty in the boundary of the detected change is accommodated, and holes and small lacunae in the object are ignored.

In block 141, a band of the image is selected. For example, the Y band is selected in a YCrCb image. Other bands, besides the Y band, can be selected. Also, as an option, multiple bands can be selected. In addition, other types of images can also be accommodated with the invention, such as an RGB or a CMYK image.

Figure 15:
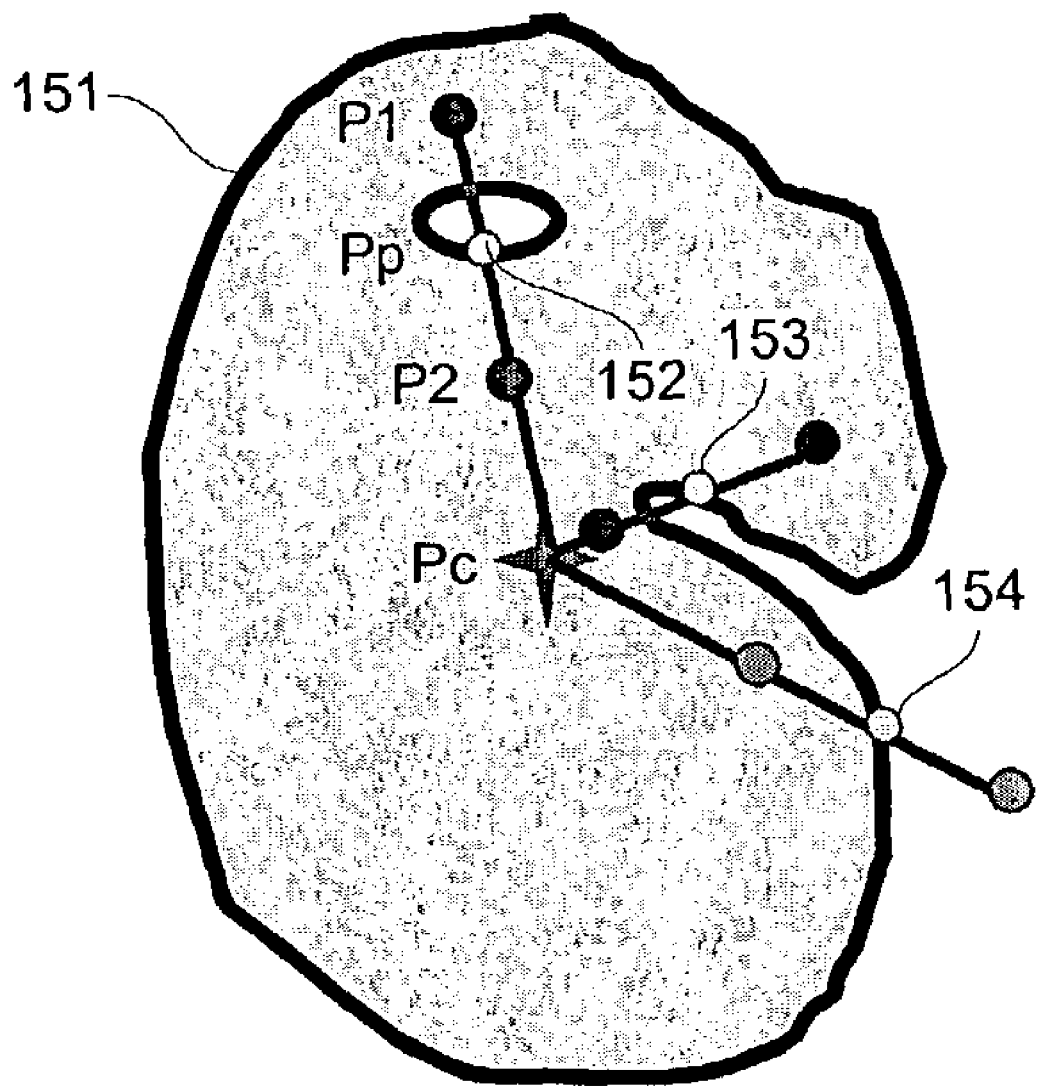
FIG. 15 illustrates determining edge strength.

In block 142, a line is selected across a perimeter pixel $P_p$ and the centroid $P_c$ of the target. In FIG. 15, the centroid $P_c$ of the target 151 is designated with a star, and the exemplary perimeter pixels 152, 153, and 154 are designated with light circles along the perimeter of the target 151. Three exemplary perimeter pixels are identified in FIG. 15, and for each perimeter pixel, a line is selected across the perimeter pixel $P_p$ and the centroid $P_c$.

In block 143, two pixels $P_1$ and $P_2$ on the line are selected at an equivalent +/− distance from the perimeter pixel $P_p$. In FIG. 15, the two pixels for each line are designated with dark circles.

In block 144, if both distance pixels are inside or outside the target, flow proceeds to block 145. Otherwise, if one distance pixel is inside the target and the other distance pixel is outside the target, flow proceeds to block 146. In FIG. 15, the perimeter pixels 152 and 153 have both distance pixels inside the target 151, and the perimeter pixel 154 has one distance pixel inside the target and the other distance pixel outside the target.

In block 145, if both distance pixels are inside or outside the target, the perimeter pixel is ignored, and flow proceeds to block 147. In FIG. 15, perimeter pixels 152 and 153 are ignored.

In block 146, a contrast $C_p$ of the perimeter pixel having one distance pixel inside the target and the other distance pixel outside the target is determined based on the intensity of the two distance pixels $I_{p1}$ and $I_{p2}$ as follows: $C_p = |I_{p1} - I_{p2}|$.

In block 147, if all perimeter pixels were checked, flow proceeds to block 148. Otherwise, flow proceeds to block 142 to continue checking the perimeter pixels.

In block 148, the average contrast is determined over all perimeter pixels for which a contrast $C_p$ was determined in block 146. This average contrast can be used as the edge strengths $E_B$ and $E_F$ in blocks 1201 and 1202, respectively.

The above discussion for FIG. 15 addressed the three exemplary perimeter pixels 152, 153, and 154 concurrently. However, in examining the perimeter pixels according to FIG. 14, each perimeter pixel is examined individually until all perimeter pixels have been examined, as per the loop back from block 147 to block 142.

Further, with the exemplar technique of FIG. 14, holes and small lacunae in the target 151 in FIG. 15 are ignored, thus increasing the robustness of the technique.

In another embodiment of the invention, the detected targets are further monitored to determine if a newly detected target was previously detected by the stationary target detection and classification 37 as a change in the background model. For example, in a surveillance application, it may be of interest to detect when a target entered a scene and then stopped moving (e.g., a car parking) and thereafter to monitor the target (or the area of the scene where the target stopped moving) to determine if and when the target moves again (e.g., a parked car leaving).

Figure 16:
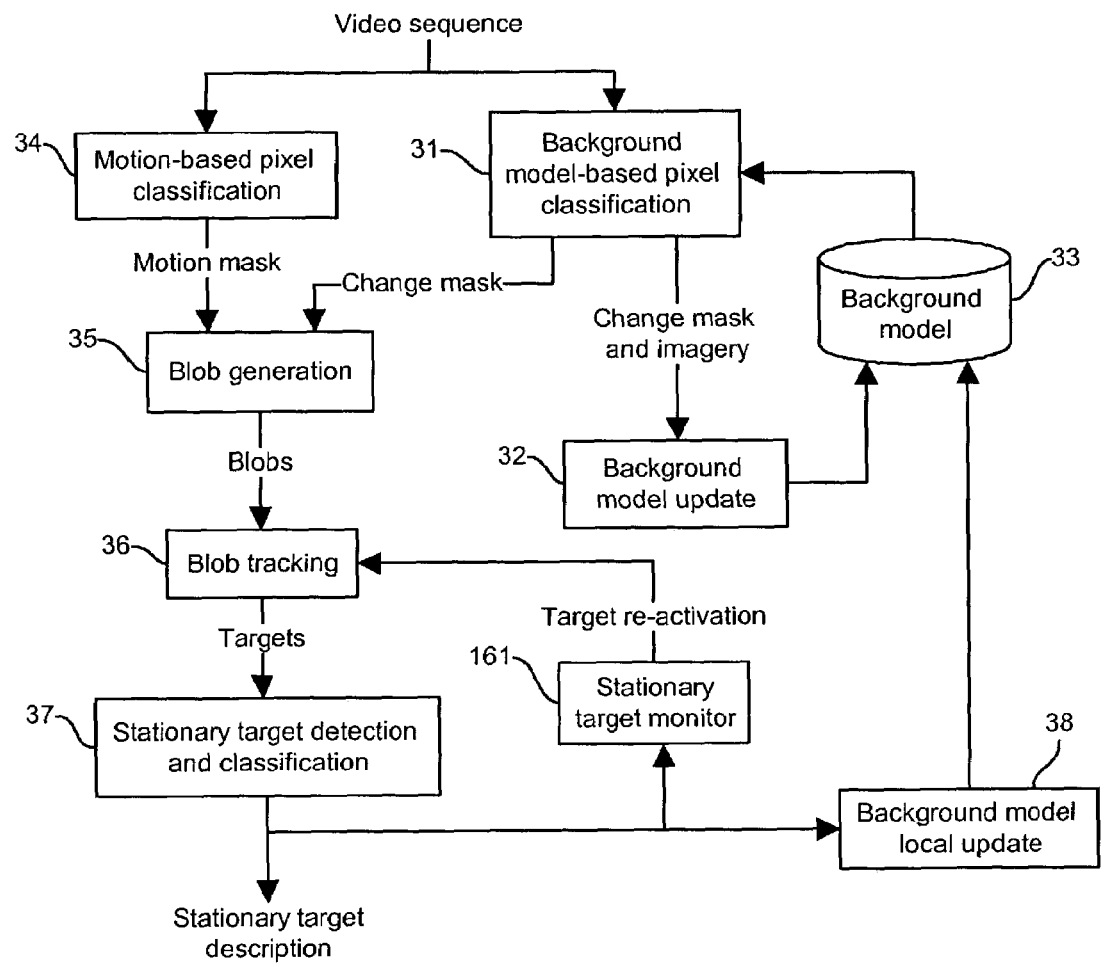
FIG. 16 illustrates a flowchart for a second embodiment of the invention.

FIG. 16 illustrates a flowchart for the second embodiment of the invention. FIG. 16 is the same as FIG. 3, except for the addition of a stationary target monitor 161. The stationary target monitor 161 receives stationary target descriptions from the stationary target detection and classification 37 and provides a target reactivation to the blob tracking 36. If stationary target is classified as an insertion, the stationary target monitor 161 records the target (e.g., time, size, color, and location) and monitors the target for any further activity. At this point, the target is "forgotten" by the rest of the system as being integrated into the background model 33 and, in effect, goes into hibernation. If, at any time later, a stationary target is detected as a removal and is reported by the stationary target detection and classification 37 in the vicinity of the previous insertion, the stationary target monitor 161 registers the removal with the hibernating stationary target and instructs the blob tracking 36 to reactivate that target.

Figure 17:
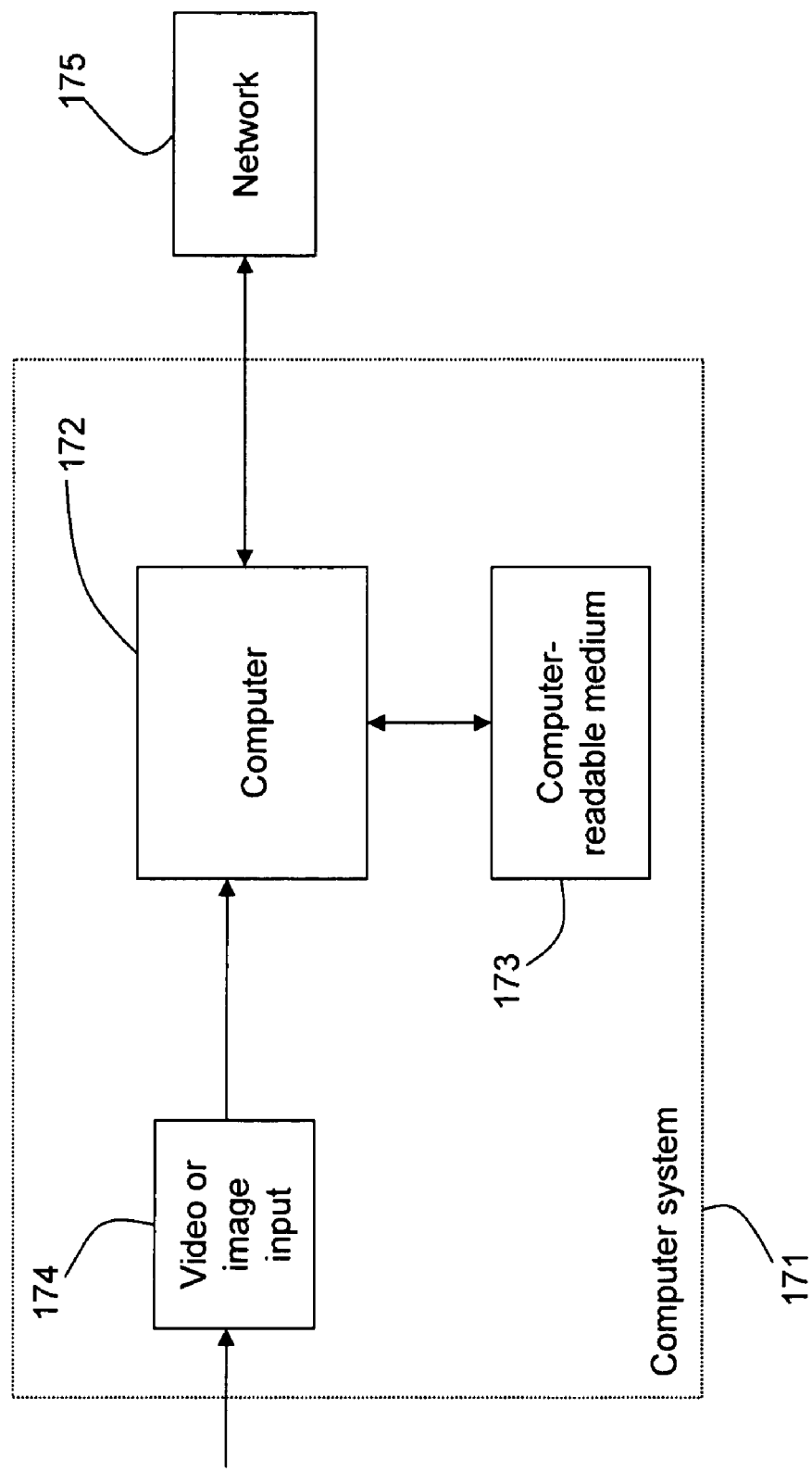
FIG. 17 illustrates an exemplary computer system.

The embodiments of the invention can be implemented with a computer system. FIG. 17 illustrates an exemplary computer system 171, which includes a computer 172 and a computer-readable medium 173. Referring to FIGS. 3 and 16, blocks 31–38 and 161 can be implemented with software residing on one or more computer-readable medium 173 of the computer system 171. Video and/or images to be processed with the invention can reside on one or more computer-readable medium 173 or be provided, for example, via the video or image input 174 or the network 175.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method for processing video, comprising the steps of:
   maintaining a background model for said video;
   detecting a target in said video;
   detecting if said target is a stationary target, wherein detecting if said target is a stationary target comprises the steps of:
   determining general motion and size change properties of said target;
   determining independent motion properties of said target; and
   determining if said target is said stationary target based on said general motion and size change properties and said independent motion properties; and
   classifying said stationary target as an insertion in said background model or a removal from said background model.

2. A method as in claim 1, wherein said general motion and size change properties comprise statistical properties of a centroid trajectory of said target and statistical properties of an area of said target.

3. A method as in claim 1, wherein said independent motion properties comprise statistical properties of moving pixels of said target.

4. A method as in claim 1, wherein determining if said target is stationary is further based on aging of said target.

5. Method for processing video, comprising the steps of:
   maintaining a background model for said video;
   detecting a target in said video;
   detecting if said target is a stationary target; and
   classifying said stationary target as an insertion in said background model or a removal from said background model, wherein classifying said stationary target comprises the steps of:
   determining an edge strength in said background model along a boundary of said stationary target;
   determining an edge strength in a current frame of video sequence along said boundary of said stationary target; and
   determining if said stationary target is said insertion or said removal based on said edge strength in said background model and said edge strength in said current frame.

6. A method as in claim 5, wherein determining said edge strength in said background model is based on a centroid pixel of said stationary target and perimeter pixels along said boundary of said stationary target.

7. A method as in claim 5, wherein determining said edge strength in said current frame is based on a centroid pixel of said stationary target and perimeter pixels along said boundary of said stationary target.

8. A computer system comprising a computer-readable medium having software to operate a computer in accordance with the method of claim 5.

9. A computer-readable medium having software to operate a computer in accordance with the method of claim 5.

10. A method for processing video, comprising the steps of:
    maintaining a background model for said video;
    detecting a target in said video;
    detecting if said target is a stationary target; and
    classifying said stationary target as an insertion in said background model or a removal from said background model, or as being unidentifiable as said insertion or said removal.

11. A method for processing video, comprising the steps of:
    maintaining a background model for said video;
    detecting a target in said video;
    detecting if said target is a stationary target; and classifying said stationary target as an insertion in said background model or a removal from said background model; and determining if said target was previously detected as a stationary target.

12. A computer system comprising a computer-readable medium having software to operate a computer in accordance with the method of claim 1.

13. A computer-readable medium having software to operate a computer in accordance with the method of claim 1.

14. A computer system for processing video, comprising:
a background model of said video;
a background model-based pixel classification to produce a change mask and imagery based on said video and said background model;
a background model update to update said background model based on said change mask and said imagery;
a motion-based pixel classification to produce a motion mask based on said video;
a blob generation to produce at least one blob based on said change mask and said motion mask;
a blob tracking to produce at least one target based on said blobs;
a stationary target detection and classification to produce a stationary target description based on each target, said stationary target description to identify each said target as an insertion in said background model or a removal from said background model; and
a background model local update to update said background model based on each said stationary target description.

15. A computer system as in claim 14, wherein said stationary target descriptions further identify each of said targets as an insertion in said background model, a removal from said background model, or as being unidentifiable as said insertion or said removal.

16. A computer system as in claim 14, further comprising:
a stationary target monitor to produce a target reactivation for said blob tracking based each said stationary target description.

17. An apparatus for processing video, comprising:
means for maintaining a background model for said video;
means for detecting a target in said video;
means for detecting if said target is a stationary target, wherein the means for detecting if said target is a stationary target comprises:
means for determining general motion and size change properties of said target;
means for determining independent motion properties of said target; and
means for determining if said target is said stationary target based on said general motion and size change properties and said independent motion properties; and
means for classifying said stationary target as an insertion in said background model or a removal from said background model.

18. An apparatus to process video adapted to perform operations comprising a method of:
maintaining a background model for said video;
detecting a target in said video;
detecting if said target is a stationary target, wherein detecting if said target is a stationary target comprises the steps of:
determining general motion and size change properties of said target;
determining independent motion Properties of said target; and
determining if said target is said stationary target based on said general motion and size change properties and said independent motion properties; and
classifying said stationary target as an insertion in said background model or a removal from said background model.

19. The apparatus of claim 18, wherein said apparatus comprises application-specific hardware to emulate a computer anchor software, said hardware adapted to perform said maintaining, said detecting a target in said video, said detecting if said target is a stationary target, and said classifying.

20. An apparatus for processing video, comprising:
means for maintaining a background model for said video;
means for detecting a target in said video;
means for detecting if said target is a stationary target; and
means for classifying said stationary target as an insertion in said background model or a removal from said background model, wherein said means for classifying said stationary target comprises:
means for determining an edge strength in said background model along a boundary of said stationary target;
means for determining an edge strength in a current frame of video sequence along said boundary of said stationary target; and
means for determining if said stationary target is said insertion or said removal based on said edge strength in said background model and said edge strength in said current frame.

21. An apparatus to process video adapted to perform operations comprising a method of:
maintaining a background model for said video;
detecting a target in said video;
detecting if said target is a stationary target; and
classifying said stationary target as an insertion in said background model or a removal from said background model, wherein classifying said stationary target comprises the steps of:
determining an edge strength in said background model along a boundary of said stationary target;
determining an edge strength in a current frame of video sequence along said boundary of said stationary target; and
determining if said stationary target is said insertion or said removal based on said edge strength in said background model and said edge strength in said current frame.

22. The apparatus of claim 21, wherein said apparatus comprises application-specific hardware to emulate a computer and/or software, said hardware adapted to perform said maintaining, said detecting a target in said video, said detecting if said target is a stationary target, and said classifying.

* * * * *